(12) United States Patent
Sundermann et al.

(10) Patent No.: US 9,518,356 B2
(45) Date of Patent: Dec. 13, 2016

(54) METHOD AND APPARATUS FOR FORMING A CURVED PREPREG STRIP

(71) Applicant: AIRBUS OPERATIONS GMBH, Hamburg (DE)

(72) Inventors: Rolf Sundermann, Buxtehude (DE); Alexander Gillessen, Stade (DE); Jan Schoppmeier, Wennigsen (DE); Tassilo Witte, Stade (DE); Julian Kupski, Stade (DE); Rene-Philipp Jaekel, Springe (DE); Mohamed-Mourad Sayeh, Rades (TN)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/082,869

(22) Filed: Nov. 18, 2013

(65) Prior Publication Data

US 2014/0141193 A1 May 22, 2014

Related U.S. Application Data

(60) Provisional application No. 61/728,267, filed on Nov. 20, 2012.

(30) Foreign Application Priority Data

Nov. 20, 2012 (EP) ..................................... 12193434

(51) Int. Cl.
*B29C 43/46* (2006.01)
*D06M 15/705* (2006.01)
(Continued)

(52) U.S. Cl.
CPC .......... *D06M 15/705* (2013.01); *B29C 70/504* (2013.01); *D06M 15/70* (2013.01);
(Continued)

(58) Field of Classification Search
CPC .................................................... B29C 70/504
(Continued)

(56) References Cited

U.S. PATENT DOCUMENTS 3,019,475 A * 2/1962 Smith ........................ 425/335
3,852,948 A * 12/1974 Ruddell ................... D01G 1/06
28/281

(Continued)

FOREIGN PATENT DOCUMENTS

| DE | 102009008329 | 8/2010 |
|---|---|---|
| EP | 2233625 | 9/2010 |
| EP | 2505706 | 10/2012 |
| JP | 51084974 | 7/1976 |

OTHER PUBLICATIONS

European Search Report for Application No. 12193434.3 dated May 6, 2013.

(Continued)

*Primary Examiner* — Joseph S. Del Sole
*Assistant Examiner* — Thukhanh T Nguyen
(74) *Attorney, Agent, or Firm* — Jenkins, Wilson, Taylor & Hunt, P.A.

(57) ABSTRACT

The present invention relates to a method of forming a curved prepreg strip or sheet, especially for use in fabricating a composite component. The method includes providing a strip or sheet of prepreg material having reinforcing fibers and drawing or conveying the prepreg material in a travel direction, wherein the material is drawn or conveyed in the travel direction at a speed which differs across a width of the strip or sheet transverse to the travel direction. Similarly, the invention relates to an apparatus for forming a curved prepreg strip or sheet, having: a mechanism for drawing or conveying a strip or sheet of prepreg material in a travel direction, wherein the mechanism is configured to draw or convey the strip or sheet of prepreg material in the travel (Continued)

direction at a speed which differs across a width of the strip or sheet transverse to the travel direction.

6 Claims, 4 Drawing Sheets

(51) Int. Cl.
    *B29C 70/50*     (2006.01)
    *D06M 15/70*     (2006.01)
    *B29L 31/00*     (2006.01)
    *B29K 105/08*     (2006.01)

(52) U.S. Cl.
    CPC ................ *B29K 2105/0872* (2013.01); *B29L 2031/7739* (2013.01)

(58) Field of Classification Search
    USPC ........ 425/335, 363, 366, 384; 264/288, 291, 264/292
    See application file for complete search history.

(56) References Cited

U.S. PATENT DOCUMENTS

| | | | | |
|---|---|---|---|---|
| 3,912,440 A | * | 10/1975 | Koss | B29C 55/045 425/363 |
| 3,962,760 A | * | 6/1976 | Koss | B29C 55/045 425/366 |
| 4,554,713 A | * | 11/1985 | Chabal | 425/366 |
| 4,652,322 A | * | 3/1987 | Lim | D04H 1/54 264/288.8 |
| 5,071,601 A | * | 12/1991 | Matsuda | 264/481 |
| 5,394,906 A | | 3/1995 | Farley | |
| 6,454,555 B1 | * | 9/2002 | Kierbel et al. | 425/302.1 |
| 8,668,796 B2 | | 3/2014 | Niefnecker | |
| 2010/0285265 A1 | | 11/2010 | Shinoda et al. | |

OTHER PUBLICATIONS

European Office Action for Application No. 12 193 434.3 dated Sep. 30, 2015.

* cited by examiner

METHOD AND APPARATUS FOR FORMING A CURVED PREPREG STRIP

CROSS-REFERENCE TO RELATED APPLICATIONS

This application claims the benefit of and priority to U.S. Provisional Application No. 61/728,267, filed Nov. 20, 2012, and European patent application No. 12 193 434.3, filed Nov. 20, 2012, the entire disclosures of which are incorporated herein by reference.

FIELD OF THE INVENTION

The present invention relates to a method and apparatus for forming a curved prepreg strip or sheet, especially for use in the fabrication of a fibre-reinforced composite component, particularly one with a complex geometry. This invention also relates to a prepreg strip or sheet formed by such a method and/or apparatus, as well as to a fibre-reinforced composite component which incorporates such a prepreg strip or sheet.

BACKGROUND

Currently, composite parts that are straight or only slightly bent can be produced by manual or semi-automated processes. The production of curved composite parts, however, represents a great challenge. One of the main problems in this regard is the draping of a prepreg strip or sheet over a curved profile because the different lengths of the curved geometry between a radially inner region and a radially outer region typically result in wrinkles and/or fibre distortions in the prepreg strip or sheet, as well as gaps between prepreg strips or sheets. To address these problems, techniques including the cutting of the prepreg strips and sheets to minimize wrinkles and distortions have been employed, but these techniques are extremely time consuming.

SUMMARY

It is therefore an idea of the present invention to provide a new and improved technique for overcoming the problem of wrinkles, distortions and/or gaps in a prepreg strip or sheet to be draped over a curved profile in the fabrication of a fibre-reinforced composite component.

According to one aspect, therefore, the invention provides a method of forming a curved prepreg strip or sheet, especially for use in fabricating a composite component, the method comprising the steps of providing a strip or sheet of prepreg material having reinforcing fibres; and drawing or conveying the strip or sheet of prepreg material in a travel direction, wherein the strip or sheet is drawn or conveyed in the travel direction at a speed which differs across a width of the strip or sheet transverse to the travel direction.

By varying the speed of the prepreg strip or sheet across a width thereof transverse to the travel direction, such that different portions of the strip or sheet across its width are drawn or conveyed in the travel direction at different speeds it becomes possible to modify the orientation of the fibres in the strip or sheet of prepreg material, and thereby modify or adapt the geometry of the strip or sheet to provide a curved form. In this manner, it has been found that the strip or sheet of prepreg material can be specifically suited to be draped over curved profiles in the production of a fibre-reinforced composite component without creating significant wrinkles, distortions, or gaps in the lay-up of the prepreg material.

In a preferred embodiment of the invention, the width of the strip or sheet across which the speed in the travel direction differs is substantially perpendicular to or at right angles to the travel direction. In this regard, the strip or sheet of prepreg material is typically elongate and defines a major surface that is substantially flat and planar with a leading edge, opposite lateral sides and a trailing edge. The width of the strip or sheet is typically the distance between the lateral sides. A thickness of the strip or sheet is generally small; that is the prepreg material is thin and may comprise only a single layer or perhaps just a few layers of fibres. The fibres of the prepreg may be unidirectional, or they may be multi-directional.

In a preferred embodiment, the strip or sheet is drawn or conveyed in the travel direction at a speed that varies across the width of the strip or sheet from a first higher speed at a first lateral side to a second lower speed at a second lateral side of said strip or sheet. In particular, the speed preferably varies substantially continuously across the width of the strip or sheet from the first speed at the first lateral side to the second speed at the second lateral side, and preferably in a linear relationship with distance across the width of the strip or sheet. By virtue of the fact that the speed of the strip or sheet in the travel direction varies across its width substantially continuously, it is thus possible to achieve substantially uniform modification in orientation of the fibres in the prepreg material.

By pre-selecting a maximum speed difference across the width of the strip or sheet between the first speed at the first lateral side and the second speed at the second lateral side, it is possible to predetermine the degree of modification to the orientation of the fibres in the prepreg material and, in turn, the extent of modification to the geometry of the strip or sheet; e.g. the amount of curvature imparted to the strip or sheet. For a higher degree of curvature, for example, the maximum speed difference across the width of the strip or sheet is preferably in a ratio of greater than or equal to about 2:1, e.g. 3:1. For a lower degree of curvature, on the other hand, the maximum speed difference across the width of the strip or sheet is preferably in a ratio of less than about 2:1, e.g. in the range of 1.1:1 to 1.9:1.

In a particularly preferred embodiment, the step of drawing or conveying includes: feeding and/or rolling the strip or sheet of prepreg material in the travel direction between a pair of conical rollers that are driven at substantially the same rotational speed, i.e. in counter rotation. In this regard, the strip or sheet of prepreg material is preferably drawn or conveyed in the nip of the pair of conical rollers, whereby one of said pair of rollers contacts an upper surface of the strip or sheet of prepreg material across said width thereof and the other of said rollers contacts a lower surface of the strip or sheet of prepreg material across said width thereof. The travel direction is determined by a tangential velocity of the rollers at the contact with the strip or sheet of prepreg material in the nip. Both of the rollers of the pair preferably have substantially the same geometry, including a circular cross-section which tapers axially across the width of the strip or sheet at a substantially constant angle from a larger diameter at one axial end on the first lateral side to a smaller diameter at an opposite axial end on the second lateral side.

By selecting a regular frustro-conical geometry for each of the pair of rollers, the desired continuity in the variation of the drawn or conveyed speed of the strip or sheet across the width thereof is provided. Furthermore, by pre-selecting the respective larger and smaller diameters of the respective ends of each of the rollers, a particular speed difference across the width of the strip or sheet of prepreg material is able to be predetermined.

In a preferred embodiment, the method may include the step of feeding and/or rolling the strip or sheet of prepreg material in the travel direction between the pair of conical rollers a number of times or, in the alternative, between a series of multiple pairs of conical rollers. In this way, the strip or sheet may undergo a repeated treatment or processing by the rollers to increase or enhance spreading or reorientation of the reinforcing fibres in the prepreg, thereby increasing the curvature of the strip or sheet.

In a preferred embodiment, the method further comprises the step of heating the strip or sheet of prepreg material before and/or during the drawing or conveying step. In this regard, the prepreg material typically includes a polymer resin, the viscosity of which is influenced by temperature. Accordingly, by heating the strip or sheet of prepreg material, the strip or sheet will generally become softer and less stiff, which in turn enhances its ease of processing in the above method.

By processing strips or sheets of prepreg material with the method described above, the invention is able to form curved prepreg strips or sheets in a highly reproducible manner. The curvature of a strip or sheet can be tailored to a particular geometry required such that the problems of wrinkles, fibre distortions and/or gaps in the production of a composite are avoided without time-consuming prior art cutting techniques. Furthermore, it is possible to form not only uni-directional prepregs, but also to customize the fibre orientation of the prepreg material, such as ±45°.

According to another aspect, the present invention provides an apparatus for forming a curved prepreg strip or sheet, especially for use in fabricating a composite component, the apparatus comprising: a mechanism for drawing or conveying a strip or sheet of prepreg material in a travel direction, wherein the mechanism is configured to draw or convey the strip or sheet of prepreg material in the travel direction at a speed which differs across a width of the strip or sheet transverse to the travel direction.

In a preferred embodiment of the invention, the mechanism is configured to draw or convey the strip or sheet of prepreg material in the travel direction at a speed that varies over or across the width of the strip or sheet from a first speed at a first lateral side to a second speed at a second lateral side of that strip or sheet. Preferably, the speed varies substantially continuously across the width of the strip or sheet from the first speed at the first lateral side to the second speed at the second lateral side. The variation of the speed in the travel direction across the width of the strip or sheet may, for example, vary linearly from the first speed at the first lateral side to the second speed at the second lateral side.

As noted above, in a preferred embodiment the mechanism may include a pair of conical rollers configured to be driven at substantially the same rotational speed. The strip or sheet of prepreg material is thus drawn or conveyed in the nip of the pair of conical rollers, whereby one of the said pair of rollers contacts an upper surface of the strip or sheet of prepreg material across the width thereof and the other of said rollers contacts a lower surface of the strip or sheet of prepreg material across the width thereof. Particularly preferably, both of the rollers have substantially the same geometry, including a circular cross-section that tapers in an axial direction at a substantially constant angle from a larger diameter at one axial end to a smaller diameter at an opposite axial end.

In a preferred embodiment, the mechanism comprises multiple pairs of the conical rollers arranged serially in the travel path of the strip or sheet of prepreg material.

In a preferred embodiment, the apparatus further comprises at least one heating device for heating the strip or sheet of prepreg material as it is drawn or conveyed along the travel direction. Particularly preferably, the apparatus may include a plurality of heating devices arranged for heating the strip or sheet of prepreg material over its travel path through the apparatus as it is drawn or conveyed in the travel direction.

According to a further aspect, the present invention provides a curved prepreg strip or sheet formed by a method and/or by an apparatus of the invention as described according to any one of the embodiments above. Thus, the invention may provide a strip or sheet of prepreg material comprising a plurality of reinforcing fibres in a matrix of a non-hardened polymer resin, wherein the fibres have been spread or re-oriented, e.g. by rolling, to provide the strip or sheet with a curved geometry. In this regard, the curved geometry is preferably substantially within a plane of the strip or sheet itself. In yet another aspect, the invention provides a fibre-reinforced composite component that incorporates such a strip or sheet of prepreg material.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION

Figure 1:
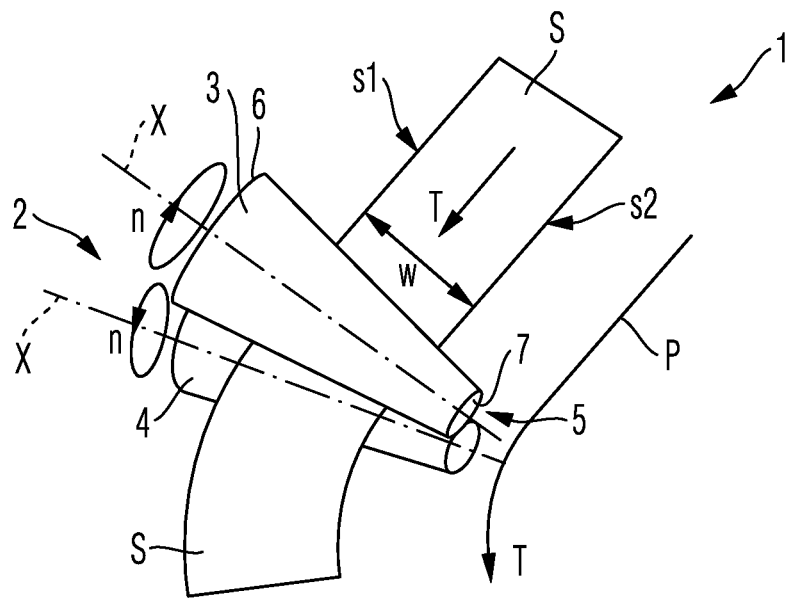
FIG. 1 is a schematic perspective view of an apparatus for forming a curved prepreg strip or sheet according to an embodiment of the invention.

With reference to FIG. 1 of the drawings, an apparatus 1 for forming a curved prepreg strip or sheet is illustrated in a simplified abstract embodiment. This apparatus 1 comprises a mechanism 2 for drawing and conveying a strip or sheet S of prepreg material in a travel direction T. In this embodiment, the strip or sheet S may be considered to be a substantially flat strip or slat of little thickness. The slat S of prepreg material comprises reinforcing fibres F (e.g. glass fibres or carbon fibres) which are arranged or arrayed in a matrix of a non-hardened polymer resin. The fibres F may, for example, be arranged uni-directionally and parallel with one another in the slat S transverse or perpendicular to a length direction of the slat (as shown in FIG. 2) or may be arranged multi-directionally in the slat, including in the length direction.

In this particular embodiment, the mechanism 2 comprises a pair of frustro-conical rollers 3, 4 arranged adjacent or next to one another for counter rotation and defining a small gap or nip 5 there-between that is configured to receive and to convey the strip or sheet S of prepreg material between the driven rollers 3, 4. Each of the upper and lower rollers 3, 4 has substantially the same geometrical configuration, being symmetrical about its central rotational axis X and having a circular cross-section which tapers in an axial direction at a substantially constant angle from a larger diameter d1 at a first axial end 6 to a smaller diameter d2 at an opposite, second axial end 7.

Each axis X of the rollers 3, 4 extends at approximately 90° to the travel direction T and the strip or sheet S of prepreg material is drawn or conveyed in the nip 5 of the pair of conical rollers 3, 4 such that the upper roller 3 contacts an upper surface of the slat S across a width w thereof, while the lower roller 4 contacts a lower surface of the slat S of prepreg material across that width. When the pair of conical rollers 3, 4 are driven in counter-rotation at essentially the same rotational speed n about their respective rotational axes X, the slat S is drawn or conveyed by the rollers 3, 4 in the travel direction T at a speed which differs across the width w of the slat S transverse to the travel direction T. In particular, because the diameter of each conical roller 3, 4 changes linearly from the maximum diameter d1 at the first end 6 of the roller proximate a first lateral side s1 of the slat S to the minimum diameter d2 at the second end 7 of the roller proximate a second lateral side s2 of the slat S, the speed imparted to the slat S between the two rollers 3, 4 varies continuously (with roller diameter) across the width w of the slat. As a result, the first lateral side s1 proximate the first axial end 6 of rollers 3, 4 is drawn or conveyed at a substantially higher speed in the travel direction than the second lateral side s2 of the strip or sheet S.

Figure 2:
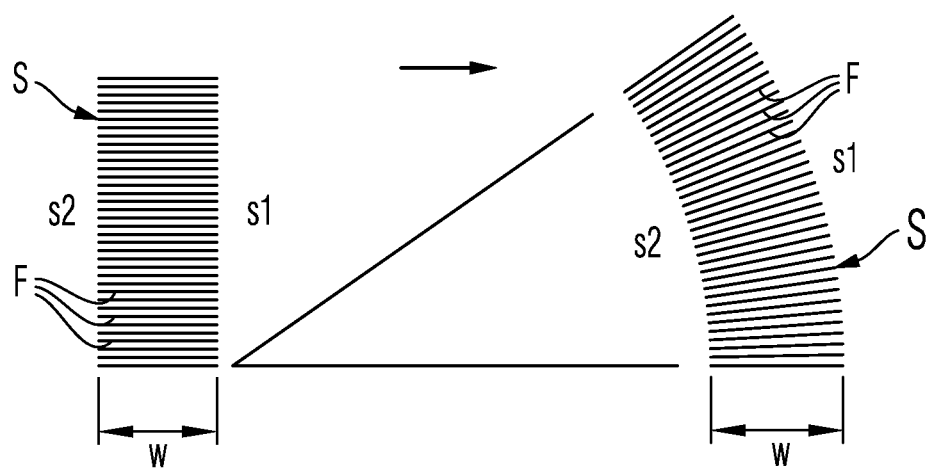
FIG. 2 is a schematic illustration of the fibre spreading in a prepreg strip or sheet formed according to the invention.

Consequently, as is particularly clearly visible from FIG. 2, the ends of the fibres F of the prepreg material that extend transversely across the slat S (i.e. in the width direction) are drawn further apart from one another at the first lateral side s1 compared to the ends of those fibres F at the second lateral side s2. That is, FIG. 2 of the drawings shows the transversely extending fibres F of the slat S both before (on left-hand side) and after (on right-hand side) the slat S has passed through the rollers 3, 4. The arcuate or curved form of the slat S generated by the frustro-conical rollers 3, 4 is clearly evident both in FIG. 1 and in FIG. 2.

Figure 3:
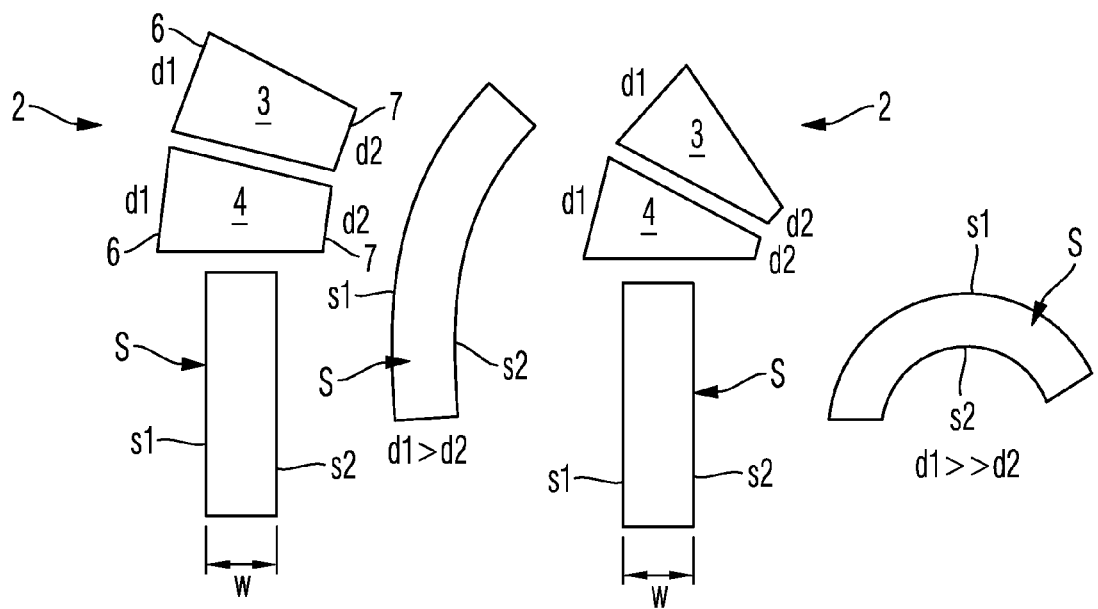
FIG. 3 is a schematic illustration of variation possible in forming a prepreg strip or sheet in accordance with the invention.

With reference now to FIG. 3 of the drawings, the influence or impact of the respective diameters of the first and second ends 6, 7 of the conical rollers 3, 4 are illustrated by two examples. In the first example (on left-hand side) of FIG. 3, the diameter d1 of the first end 6 is only somewhat larger than the diameter d2 of the second end 7 of each roller 3, 4 in the pair (e.g. d1 in the range of about 1.1 to 1.5 times the size of d2; i.e. d1>d2). This configuration produces an only moderately curved prepreg strip or slat. In the second example (on the right-hand side) of FIG. 3, by contrast, d1 is substantially greater than d2 (e.g. d1 is about three times the size of d2; i.e. d1>>d2). This configuration creates a significantly more highly curved prepreg strip or slat S.

Figure 4:
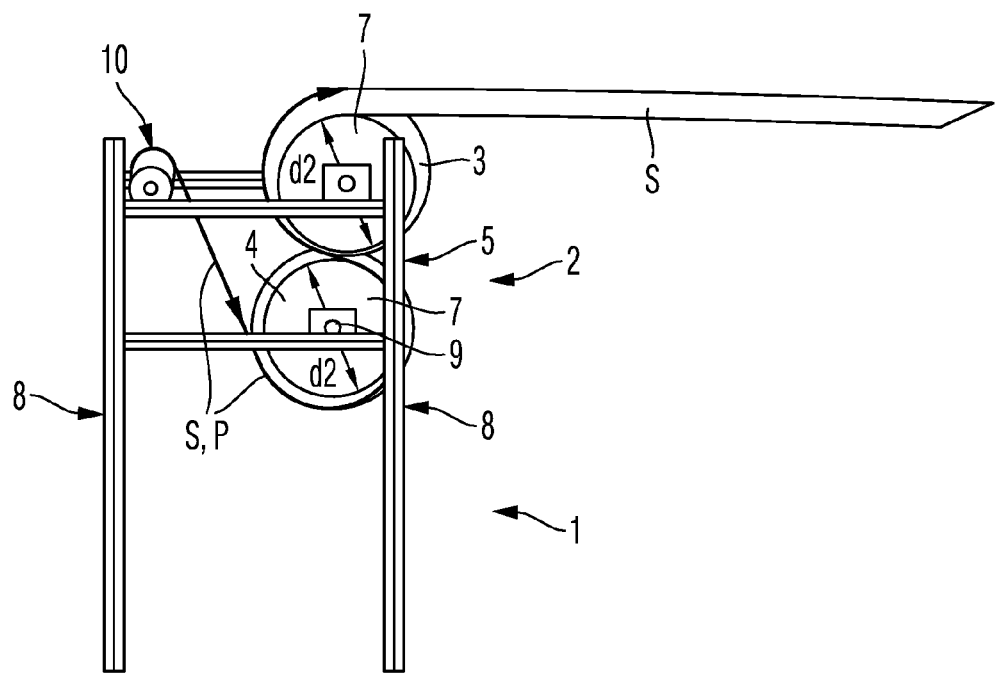
FIG. 4 is a side view of an apparatus for forming a curved prepreg strip/sheet according to another embodiment of the invention.
Figure 5:
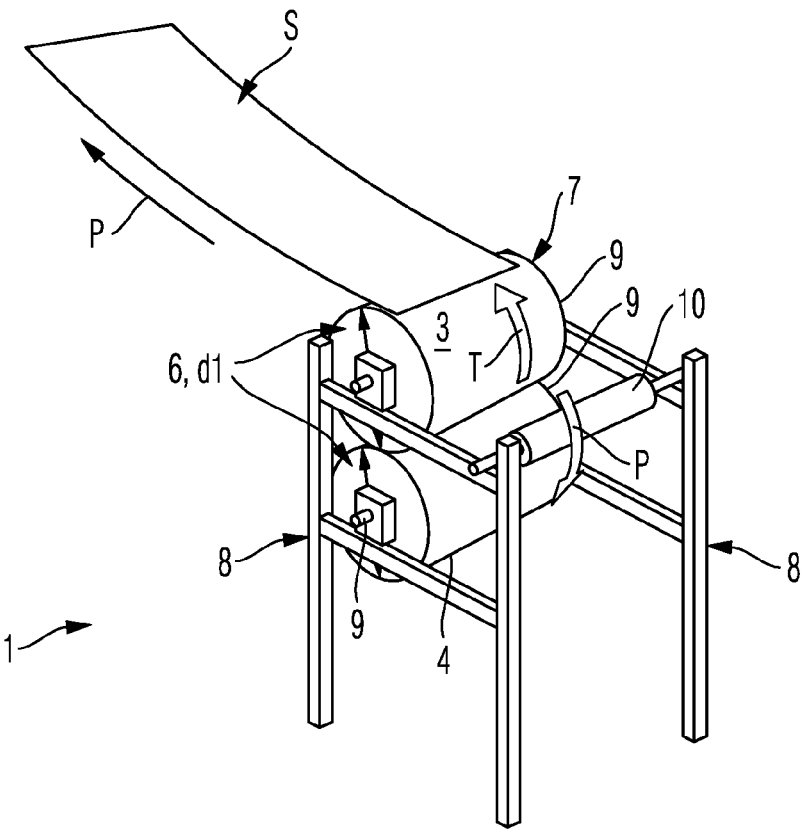
FIG. 5 is a perspective view of the apparatus in FIG. 4.

Referring now to FIGS. 4 and 5 of the drawings, another less abstract embodiment of an apparatus 1 according to this invention is illustrated. The apparatus 1 of this embodiment again includes a mechanism 2 having a pair of frustro-conical rollers 3, 4 arranged adjacent to one another and mounted for counter-rotation about the respective axes X. In this regard, each of the rollers 3, 4 is supported on a frame structure 8 and is rotationally mounted on a respective shaft 9. Also supported on the frame structure 8 is a supply roll 10 of the strip or sheet S of prepreg material for feeding between the two rollers 3, 4. A travel path P of the strip S through the apparatus 1 is particularly apparent from FIG. 4 and extends from the supply roll 10, around the lower roller 4, into the nip 5 and between the two rollers 3, 4, and then back over the upper roller 4. Arrow heads along the travel path P also indicate the travel direction T. As was the case with the embodiment of FIG. 1, the pair of rollers 3, 4 are driven in counter rotation and impart a speed to the strip or slat S in between the two rollers 3, 4 which varies across the width w of that strip or slat. As the ratio of the diameters d1, d2 of the first and second ends 6, 7 of each conical roller 3, 4 is relatively small in this case (e.g. d1:d2=about 1.2:1), the amount or degree of curvature imparted to the strip or slat S is correspondingly low.

Figure 6:
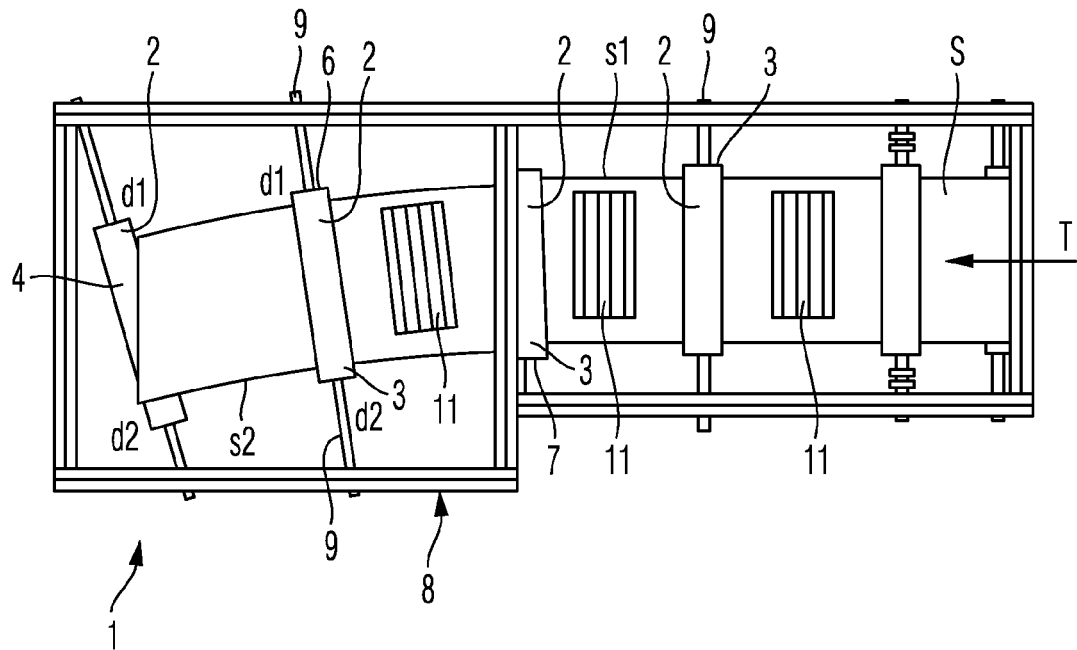
FIG. 6 is a plan view of an apparatus for forming a curved prepreg strip or sheet according to a further embodiment of the invention.
Figure 7:
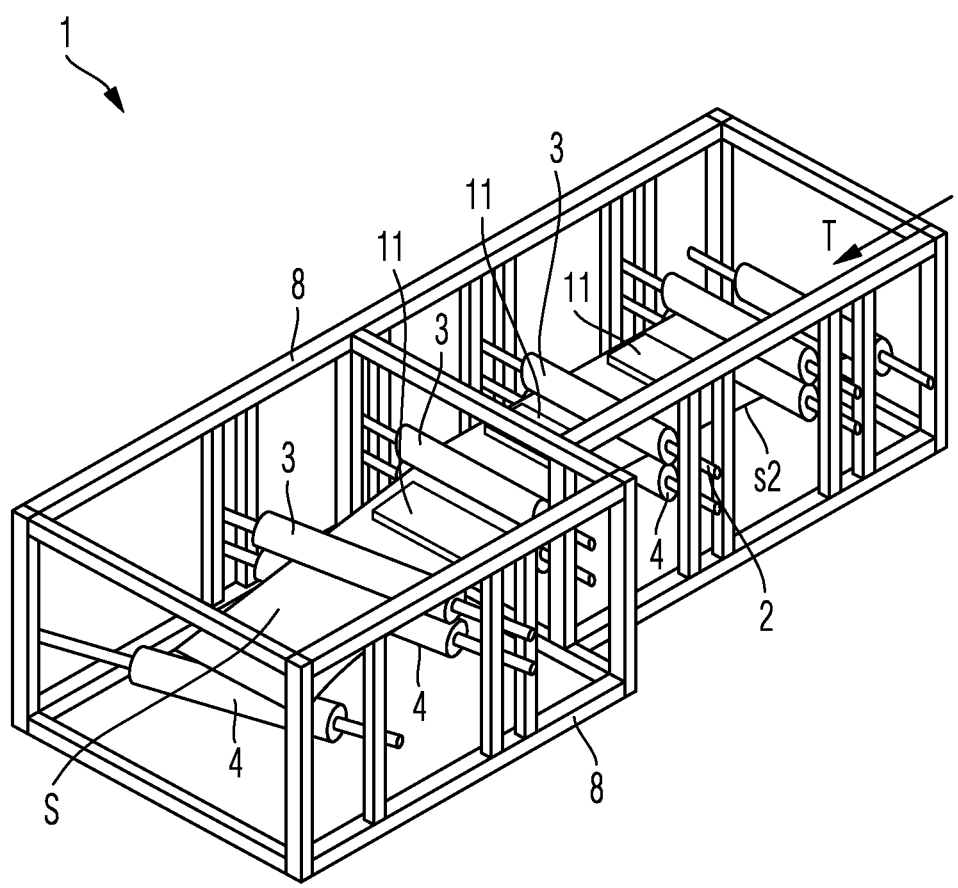
FIG. 7 is a perspective view of the apparatus in FIG. 6.

Another embodiment of an apparatus 1 according to the present invention is illustrated in FIGS. 6 and 7 of the drawings. In this embodiment, the frame structure 8 of the apparatus 1 is considerably larger than the previous embodiment and supports a plurality of pairs of the conical rollers 3, 4 spaced apart from one another in series along the travel path P of the strip or sheet S of prepreg material. The serially arranged pairs of rollers therefore progressively impart an increasing degree of curvature to the prepreg strip S as it progresses through the apparatus 1 on the travel path P. Also supported on the frame structure 8 and arranged distributed along the travel path P between the respective pairs of rollers 3, 4 are three heating devices 11 (e.g. radiant heaters) for heating the strip S as it travels through the apparatus 1. In this regard, the heating devices 11 soften the polymer matrix of the prepreg material rendering the strip or slat S less stiff and more easily workable between the conical rollers 3, 4. As an alternative to using one or more individual heating devices 11 for discrete application of localised heat to the strip S, it will be appreciated that the apparatus 1 of the invention could be installed in a chamber or room having one or more heating unit for a controlled ambient temperature.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

What is claimed is:

1. An apparatus for forming a curved fibre-reinforced prepreg strip or sheet for use in fabricating a composite component, the apparatus comprising:
    a mechanism for drawing or conveying a strip or sheet of prepreg material in a travel direction,
    wherein the mechanism is configured to draw or convey the strip or sheet of prepreg material in the travel direction at a speed which differs across a width of the strip or sheet transverse to the travel direction,
    wherein the mechanism comprises multiple pairs of conical rollers configured to be driven at substantially the same rotational speed, the multiple pairs of conical rollers arranged serially in the travel direction of the strip or sheet of prepreg material; and
    wherein each pair of conical rollers defines a nip, and wherein the strip or sheet of prepreg material is configured to be drawn or conveyed in the nip of the respective pair of conical rollers, whereby one of each pair of rollers is configured to contact an upper surface of the strip or sheet of prepreg material across the width thereof in the nip and the other of each of the rollers is configured to contact a lower surface of the strip or sheet of prepreg material across the width thereof in the respective nip, such that the rollers of each of the pairs of rollers are configured to simultaneously reorient the fibres of the prepreg strip or sheet, wherein the nip of each of the pairs of rollers is arranged in a common plane, and wherein the travel direction of the strip or sheet of prepreg material is configured to follow the common plane.

2. The apparatus according to claim 1, wherein the mechanism is configured to draw or convey the strip or sheet of prepreg material in the travel direction at a speed that varies across the width of the strip or sheet between a higher first speed at a first lateral side and a lower second speed at a second lateral side of said strip or sheet.

3. The apparatus according to claim 2, wherein the speed varies substantially continuously across the width of the strip or sheet between the first speed at the first lateral side and the second speed at the second lateral side.

4. The apparatus according to claim 1, wherein both of the rollers of said pair have substantially the same geometry, including a circular cross-section which tapers in an axial direction at a substantially constant angle from a larger diameter at one axial end to a smaller diameter at an opposite axial end.

5. The apparatus according to claim 1, further comprising at least one heating device for heating the strip or sheet of prepreg material as it is drawn or conveyed in the travel direction.

6. The apparatus according to claim 1, further comprising at least one heating device arranged between the multiple pairs of the conical rollers for heating the strip or sheet of prepreg material as it is drawn or conveyed in the travel direction.

* * * * *